United States Patent
Sun (10) Patent No.: US 9,037,086 B2
(45) Date of Patent: May 19, 2015

(54) METHOD FOR CONTROLLING BLUETOOTH DEVICE FOR POWER CONSERVATION

(71) Applicant: MediaTek Inc., Hsin-Chu (TW)

(72) Inventor: Juei-Ting Sun, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 136 days.

(21) Appl. No.: 13/800,004

(22) Filed: Mar. 13, 2013

(65) Prior Publication Data

US 2014/0154985 A1    Jun. 5, 2014

Related U.S. Application Data

(60) Provisional application No. 61/731,855, filed on Nov. 30, 2012.

(51) Int. Cl.
*H04B 7/00* (2006.01)
*H04W 52/02* (2009.01)

(52) U.S. Cl.
CPC ................................. *H04W 52/0209* (2013.01)

(58) Field of Classification Search
CPC ............................................... H04W 52/0209
USPC ........................................................ 455/41.2
See application file for complete search history.

(56) References Cited

U.S. PATENT DOCUMENTS

| 2004/0214527 | A1* | 10/2004 | Lim et al. ..................... 455/41.2 |
| 2006/0046653 | A1* | 3/2006 | Kirbas ......................... 455/41.2 |
| 2011/0076945 | A1* | 3/2011 | Chang et al. ................ 455/41.2 |

OTHER PUBLICATIONS

Bluetooth Special Interest Group "Bluetooth Master/Slave Communication and Sniff/Sniff Sub-Rating Modes" Aug. 14, 2008.*
Specification of the Bluetooth System Covered Core Package version 4.0 Current Master TOC vol. 2, Part B, Section 8.7 Jun. 30, 2010.*

* cited by examiner

*Primary Examiner* — David Bilodeau
(74) *Attorney, Agent, or Firm* — McClure, Qualey & Rodack, LLP (57) ABSTRACT

A method for controlling a Bluetooth device for power conservation includes the steps of: establishing a Bluetooth link; controlling the Bluetooth device to enter sniff mode; handling a sniff anchor point after wakeup preparation and before sleep preparation; and handling a wakeup operation between the wakeup preparation and the sleep preparation. The wakeup/sleep preparation can be also done as few times as possible in the invention such that the power consumption of the Bluetooth device is effectively reduced.

19 Claims, 9 Drawing Sheets

METHOD FOR CONTROLLING BLUETOOTH DEVICE FOR POWER CONSERVATION

CROSS REFERENCE TO RELATED APPLICATIONS

This application claims the benefit of U.S. Provisional Application No. 61/731,855, filed on Nov. 30, 2012, the entirety of which is incorporated by reference herein.

BACKGROUND OF THE INVENTION

1. Field of the Invention

The disclosure generally relates to a method for controlling a Bluetooth device, and more particularly, relates to a method for controlling a Bluetooth device for power conservation.

2. Description of the Related Art

A Bluetooth device may operate in two major states: a standby state and a connection state. Additionally, there are seven sub-states which are used to search devices or create connections, including page, page scan, inquiry, inquiry scan, master response, slave response, and inquiry response. For example, in the page scan, a slave listens for its own device access code for a duration of scan window; in the inquiry scan, the Bluetooth device is listening for inquiries from other devices for a duration of scan window. Furthermore, Bluetooth devices in the connection state can be in any of the four following modes: an active mode, a hold mode, a sniff mode, and a park mode. For example, in the active mode, a master and a slave participate actively on a channel by listening, transmitting or receiving the packets; in the sniff mode, a slave, rather than listening at every slot for messages from the master to the slave, sniffs only at specified time slots for the messages.

Generally, the Bluetooth device can save power when operating in the sleep mode. However, when it leaves or re-enters the sleep mode, some preparation work is required to be performed. Such preparation work will consume power and it would be a huge disadvantage if the Bluetooth device frequently leaves or re-enters the sleep mode and wastes its power on performing these preparation works.

Figure 1:
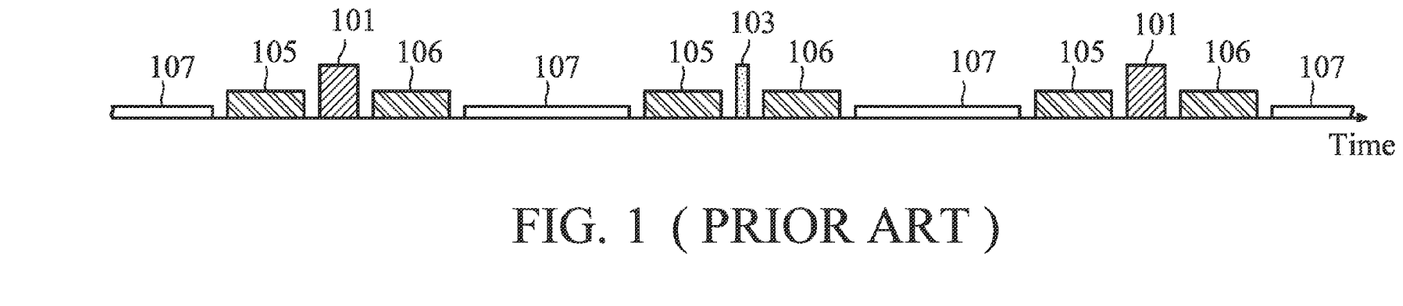
FIG. 1 is a timing diagram of operations performed by Bluetooth devices of the prior art.

FIG. 1 is a timing diagram of operations performed by Bluetooth devices of the prior art. As shown in FIG. 1, the Bluetooth device operates in sleep mode 107. When it leaves the sleep mode 107, it will first perform the wakeup preparation work 105, and then it will wake up to perform some connection operations 101 or 103, such as checking connection status or exchanging messages. After that, before it re-enters the sleep mode 107, it will perform the sleep preparation work 106. Since the Bluetooth device may frequently switch between the sleep mode and wakeup mode, the preparation work performed during the switch will consume a lot of power and shortens the life of a battery in the Bluetooth device.

BRIEF SUMMARY OF THE INVENTION

In one exemplary embodiment, the disclosure is directed to a method for controlling a Bluetooth device, comprising the steps of: establishing a Bluetooth link; controlling the Bluetooth device to enter sniff mode; handling a sniff anchor point after wakeup preparation and before sleep preparation; and further handling a first wakeup operation between the wakeup preparation and the sleep preparation.

In another exemplary embodiment, the disclosure is directed to a Bluetooth device, comprising: an antenna; an RF (Radio Frequency) module, coupled to the antenna; and a baseband module, comprising a controller, wherein the controller controls the RF module to establish a Bluetooth link, to enter sniff mode, to handle a sniff anchor point after wakeup preparation and before sleep preparation, and further to handle a wakeup operation between the wakeup preparation and the sleep preparation.

In one exemplary embodiment, the disclosure is directed to an electronic device, comprising: means for establishing a Bluetooth link; means for entering sniff mode; means for handling a sniff anchor point after wakeup preparation and before sleep preparation; and means for further handling a wakeup operation between the wakeup preparation and the sleep preparation.

In another exemplary embodiment, the disclosure is directed to a non-transitory computer-readable medium storing a computer program product operable to cause a Bluetooth device to perform operations comprising: establishing a Bluetooth link; entering sniff mode; handling a sniff anchor point after wakeup preparation and before sleep preparation; and further handling a wakeup operation between the wakeup preparation and the sleep preparation.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures thereof in the invention are shown in detail as follows.

Figure 2:
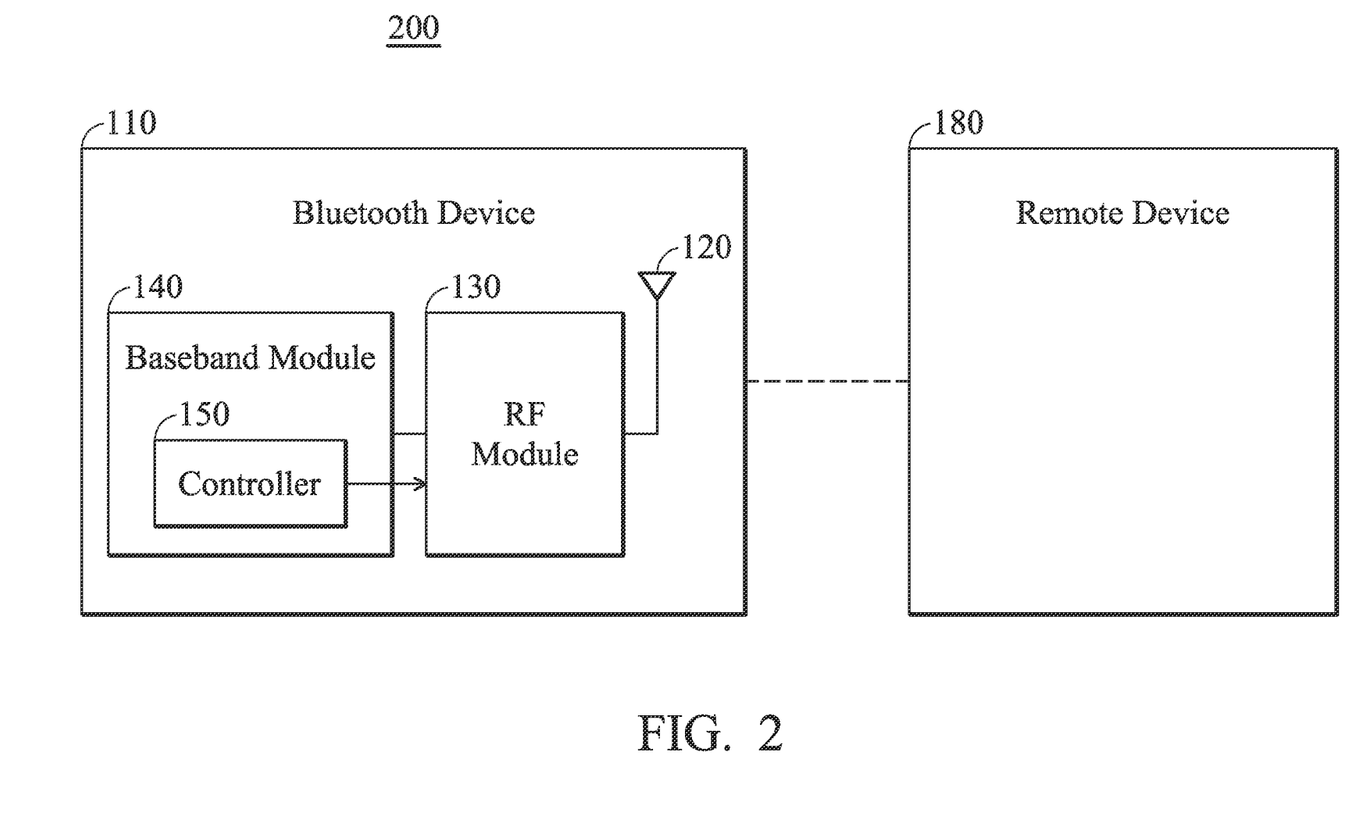
FIG. 2 is a diagram for illustrating a Bluetooth system according to an embodiment of the invention.

FIG. 2 is a diagram for illustrating a Bluetooth system 200 according to an embodiment of the invention. The Bluetooth system 200 comprises a Bluetooth device 110 and a remote device 180. The Bluetooth device 110 may be a mobile device, such as a cellular phone, a tablet computer, or a notebook computer. The remote device 180 may be another electronic device with a Bluetooth function. As shown in FIG. 2, the Bluetooth device 110 at least comprises an antenna 120, an RF (Radio Frequency) module 130, and a baseband module 140. In some embodiments, the Bluetooth device 110 may further comprise other components, such as a touch panel, a touch module, a processor, a speaker, a battery, and a housing (not shown). The type of the antenna 120 is not restricted in the invention. For example, the antenna 120 may be a monopole antenna, a dipole antenna, a loop antenna, a PIFA (Planar Inverted F Antenna), a patch antenna, or a chip antenna. The RF module 130 is coupled to the antenna 120. The RF module 130 comprises a Bluetooth module (not shown) for processing a Bluetooth signal, and transmits or receives the Bluetooth signal via the antenna 120. The baseband module 140 comprises a controller 150 for controlling the RF module 130. In some embodiments, the controller 150 may be implemented with hardware (e.g., a processing device) or software (e.g., program codes stored in a non-transitory computer-readable medium and executed by a processing device). Generally, the controller 150 is configured to perform the method of the invention. The following embodiments will describe how the controller 150 controls the operations of the Bluetooth device 110 and the RF module 130 in detail.

Figure 3:
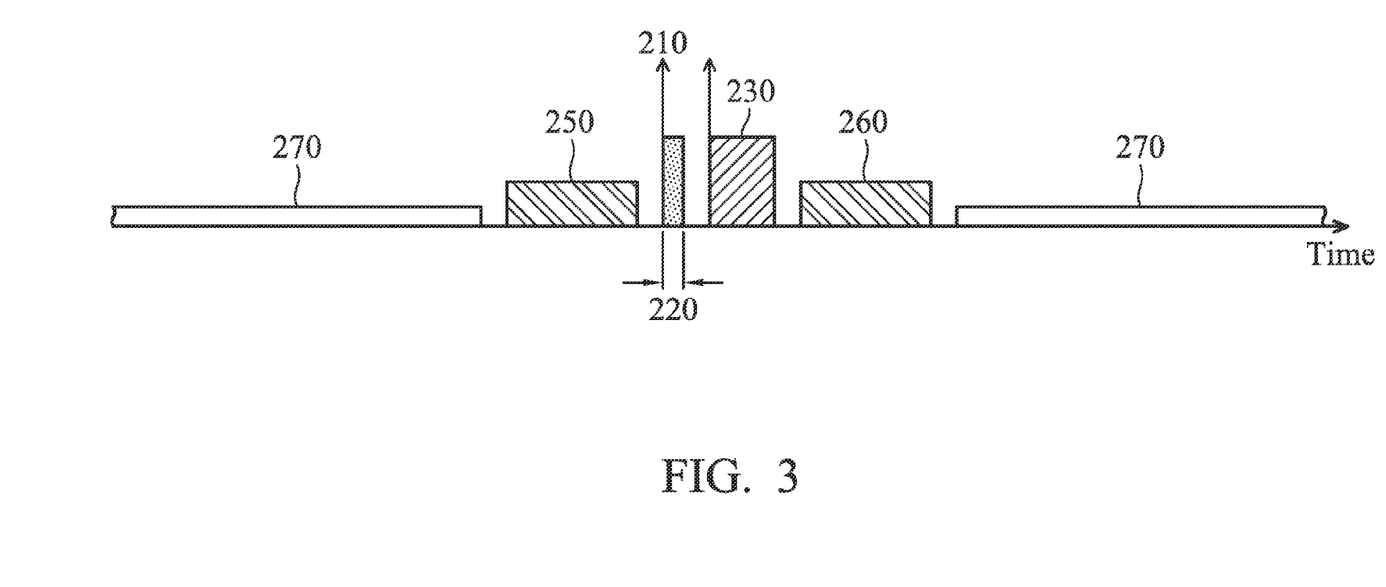
FIG. 3 is a timing diagram for illustrating operations of a Bluetooth device and an RF (Radio Frequency) module therein according to an embodiment of the invention.

FIG. 3 is a diagram for illustrating the operations of the Bluetooth device 110 and the RF module 130 therein on a time axis according to an embodiment of the invention. Refer to FIG. 2 and FIG. 3 together. In a preferred embodiment, the RF module 130 is controlled to establish a Bluetooth link between the Bluetooth device 110 and the remote device 180. The remote device 180 may also comprise an antenna and an RF module (not shown) for wireless communication. Next, the Bluetooth device 110 is further controlled to enter sniff mode and to handle a sniff anchor point 210. Here, the Bluetooth device 110 will first perform wakeup preparation 250, and then handle the sniff anchor point 210 and several connection operations, such as a first wakeup operation 230, and then perform sleep preparation 260. Note that the foregoing operations are not required to be performed in order. In some embodiments, the first wakeup operation 230 is a page scan or an inquiry scan. The handling of the sniff anchor point 210 and its following sniff attempt (during a short time period 220) are considered as another wakeup operation which is different from the first wakeup operation 230. In some embodiments, the Bluetooth device 110 and the RF module 130 therein exchange packages with the remote device 180 during the short time period 220 after the sniff anchor point 210. As shown in FIG. 3, in the beginning, the Bluetooth device 110 and the RF module 130 therein operate in a sleep mode 270 to save power. During the sleep mode 270, the Bluetooth device 110 can use a low power oscillator instead of a work oscillator. In some embodiments, the wakeup preparation 250 comprises a clock settling count and/or clock compensation. The connection operations or the wakeup operations can be the handling of the sniff anchor point 210, the sniff attempt, the page scan, and/or the inquiry scan. After the operations are performed, the RF module 130 should do the sleep preparation 260 and then enter the sleep mode 270 again to save power.

In a preferred embodiment of the invention, at least two wakeup operations, comprising the handling of the sniff anchor point 210 and the first wakeup operation 230, are concentrated and performed between the wakeup preparation 250 and the sleep preparation 260. Note that the Bluetooth device 110 and the RF module 130 therein do not enter any sleep mode 270 between the wakeup preparation 250 and the sleep preparation 260. Once the Bluetooth device 110 and the RF module 130 therein wake up, the at least two wakeup operations are performed intensively between the wakeup preparation 250 and the sleep preparation 260. In the embodiment, the handling of the sniff anchor point 210 is close to the first wakeup operation 230, and the performed order is not limited. That is, the handling of the sniff anchor point 210 may be before or after the first wakeup operation 230. The requirement is that the at least two wakeup operations are close to each other when represented on the time axis. The Bluetooth device 110 and the RF module 130 therein are prevented from switching between the sleep mode and the wakeup mode for many times. In addition, each wakeup/sleep preparation is shared by a plurality of close wakeup operations (e.g., the sniff anchor point 210 shares the wakeup preparation 250 and the sleep preparation 260 with the first wakeup operation 230). Accordingly, the wakeup/sleep preparation can be done as few times as possible, and the power consumption of the Bluetooth device 110 is effectively reduced in the invention.

In some embodiments, the wakeup operations are performed periodically. To arrange the wakeup operations intensively and achieve the effect of power conservation, the intervals of the wakeup operations should be appropriately adjusted. Refer to the following embodiments.

Figure 4:
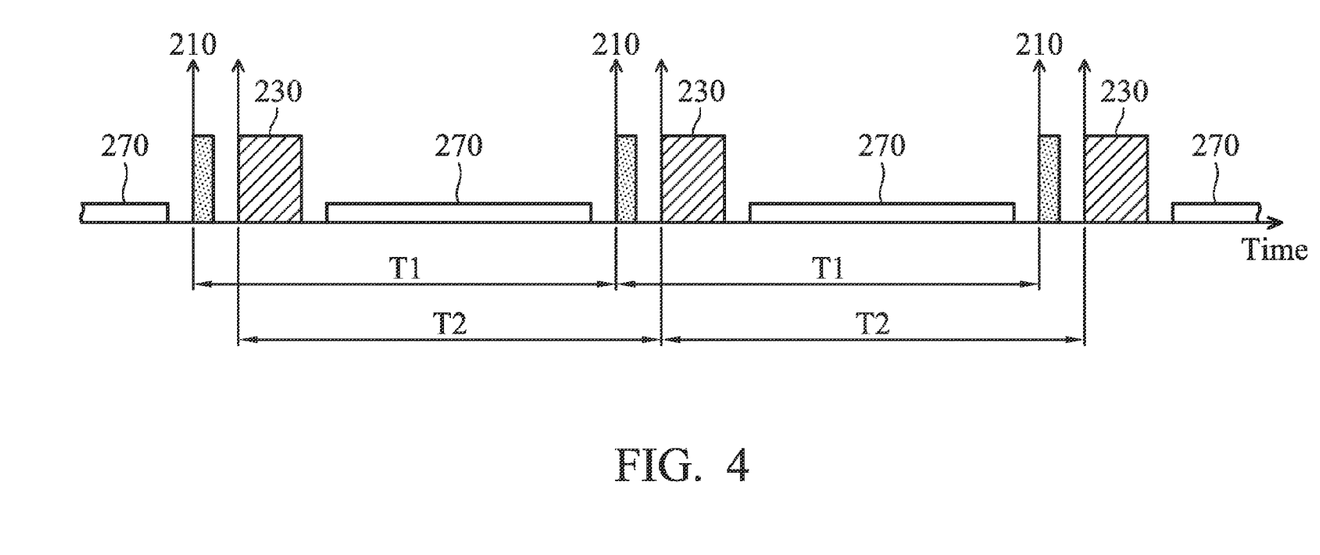
FIG. 4 is a timing diagram for illustrating operations of a Bluetooth device and an RF module according to an embodiment of the invention.

FIG. 4 is a diagram for illustrating the operations of the Bluetooth device 110 and the RF module 130 therein on a time axis according to an embodiment of the invention. To simplify the diagram, the wakeup preparation 250 and the sleep preparation 260 are omitted in FIG. 4. It is understood that the wakeup preparation 250 is always done during the transition from the sleep mode 270 to any wakeup operation, and that the sleep preparation 260 is always done during the transition from any wakeup operation to the sleep mode 270. As shown in FIG. 4, the sniff anchor point 210 is handled periodically at intervals of a first time period T1, and the first wakeup operation 230 is performed periodically at intervals of a second time period T2. In the embodiment, the first time period T1 is substantially equal to the second time period T2. According to the arrangement of FIG. 4, in each periodic cycle, the sniff anchor points 210 can be close to the first wakeup operation 230. In the embodiment, the wakeup/sleep preparation is done as few times as possible, and the power consumption of the Bluetooth device 110 is effectively reduced.

Figure 5:
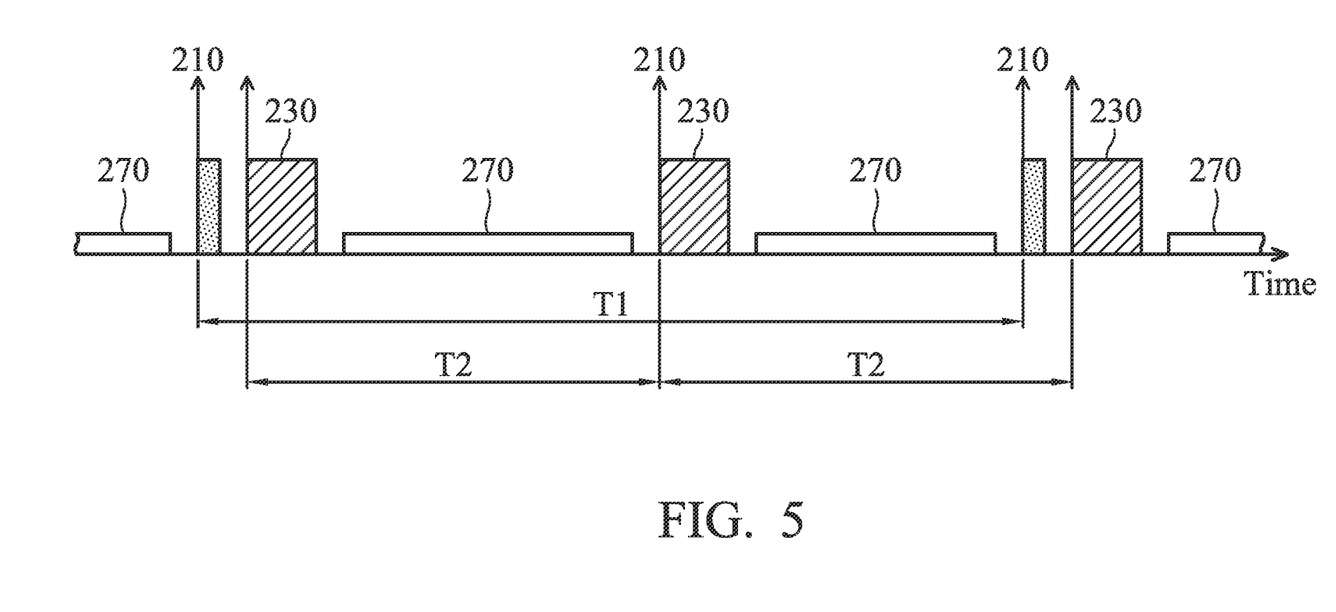
FIG. 5 is a timing diagram for illustrating operations of a Bluetooth device and an RF module therein according to an embodiment of the invention.

FIG. 5 is a diagram for illustrating the operations of the Bluetooth device 110 and the RF module 130 therein on a time axis according to an embodiment of the invention. FIG. 5 is similar to FIG. 4. The difference from the embodiment of FIG. 4 is that the first time period T1 is substantially a multiple of the second time period T2. The multiple may be any positive integer greater than 1, such as 2, 3, 4, or 5, etc. In the embodiment, the wakeup/sleep preparation is also done as few times as possible, and the power consumption of the Bluetooth device 110 is effectively reduced. Other features of the embodiment of FIG. 5 are the same as those of FIG. 4. Accordingly, the two embodiments can achieve similar effects.

Figure 6:
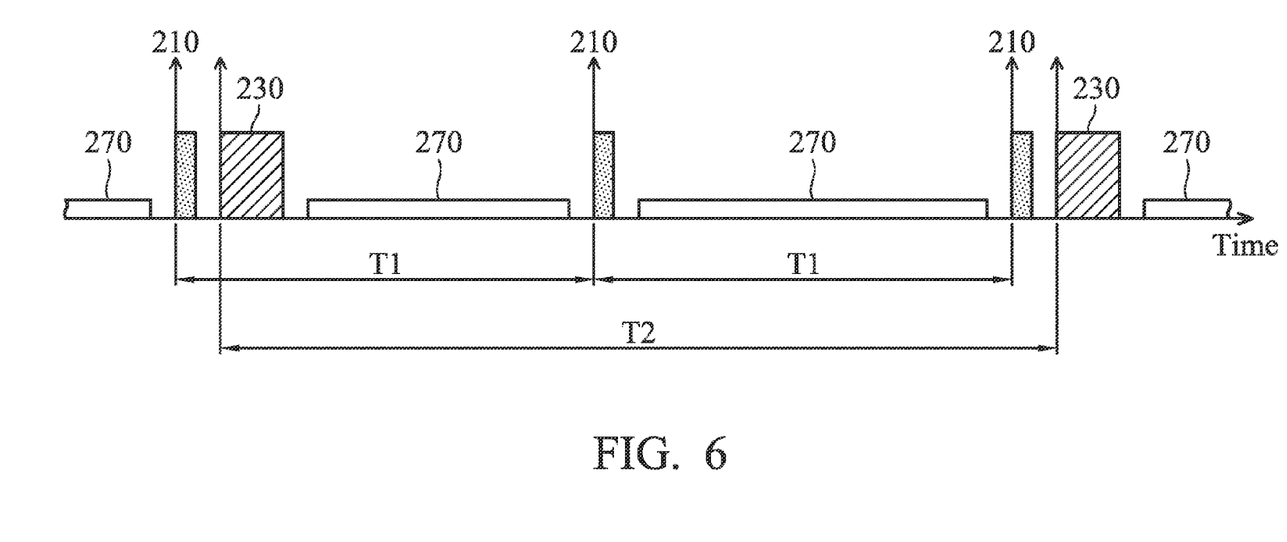
FIG. 6 is a timing diagram for illustrating operations of a Bluetooth device and an RF module therein according to an embodiment of the invention.

FIG. 6 is a diagram for illustrating the operations of the Bluetooth device 110 and the RF module 130 therein on a time axis according to an embodiment of the invention. FIG. 6 is similar to FIG. 4. The difference from the embodiment of FIG. 4 is that the second time period T2 is substantially a multiple of the first time period T1. The multiple may be any positive integer greater than 1, such as 2, 3, 4, or 5, etc. In the embodiment, the wakeup/sleep preparation is also done as few times as possible, and the power consumption of the Bluetooth device 110 is effectively reduced. Other features of the embodiment of FIG. 6 are the same as those of FIG. 4. Accordingly, the two embodiments can achieve similar effects.

Figure 7:
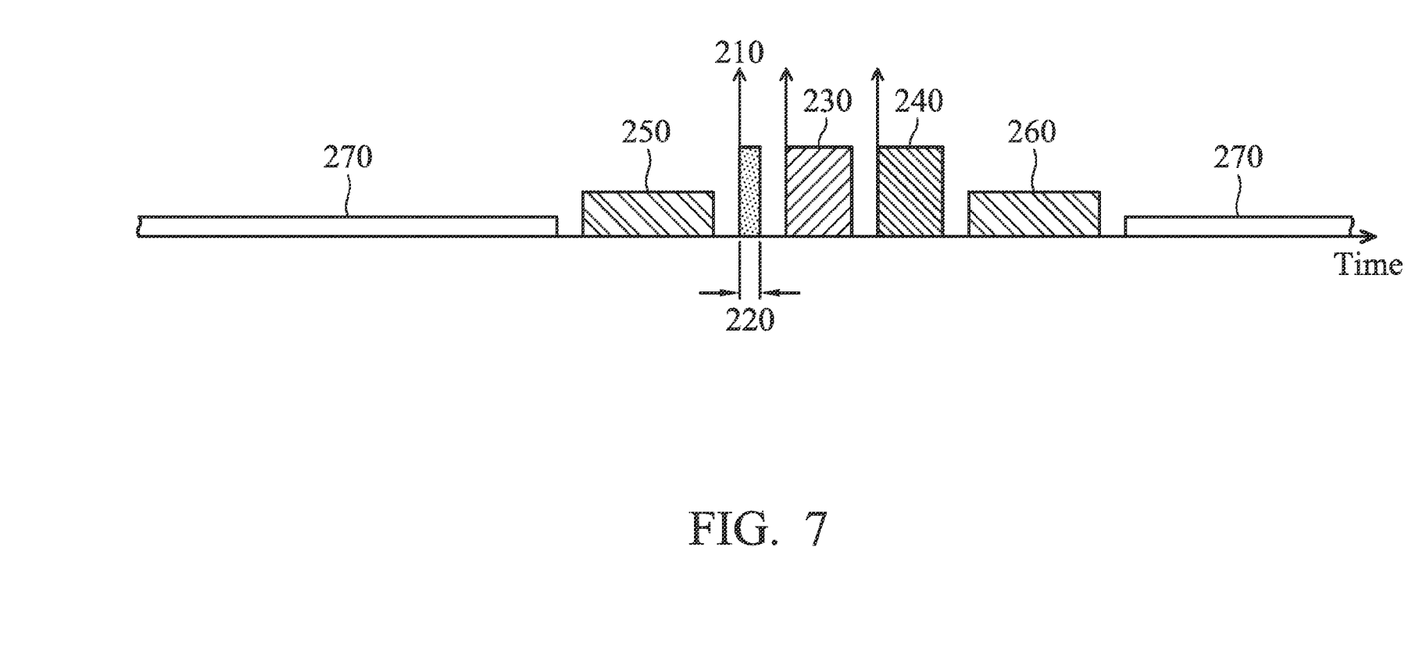
FIG. 7 is a timing diagram for illustrating operations of a Bluetooth device and an RF module therein according to an embodiment of the invention.

FIG. 7 is a diagram for illustrating the operations of the Bluetooth device 110 and the RF module 130 therein on a time axis according to an embodiment of the invention. FIG. 7 is similar to FIG. 3. The difference from the embodiment of FIG. 3 is that the controller 150 further controls the RF module 130 to handle a second wakeup operation 240 between the wakeup preparation 250 and the sleep preparation 260. Similarly, the Bluetooth device 110 and the RF module 130 therein do not enter any sleep mode 270 between the wakeup preparation 250 and the sleep preparation 260. In some embodiments, the first wakeup operation 230 is a page scan, and the second wakeup operation 240 is an inquiry scan. The handling of the sniff anchor point 210, the first wakeup operation 230, and the second wakeup operation 240 are close to each other on a time axis, and the performed order is not limited. In the embodiment, the wakeup/sleep preparation is also done as few times as possible, and the power consumption of the Bluetooth device 110 is effectively reduced. Similarly, four or more wakeup operations may be performed between the wakeup preparation 250 and the sleep preparation 260. Other features of the embodiment of FIG. 7 are the same as those of FIG. 3. Accordingly, the two embodiments can achieve similar effects.

Figure 8:
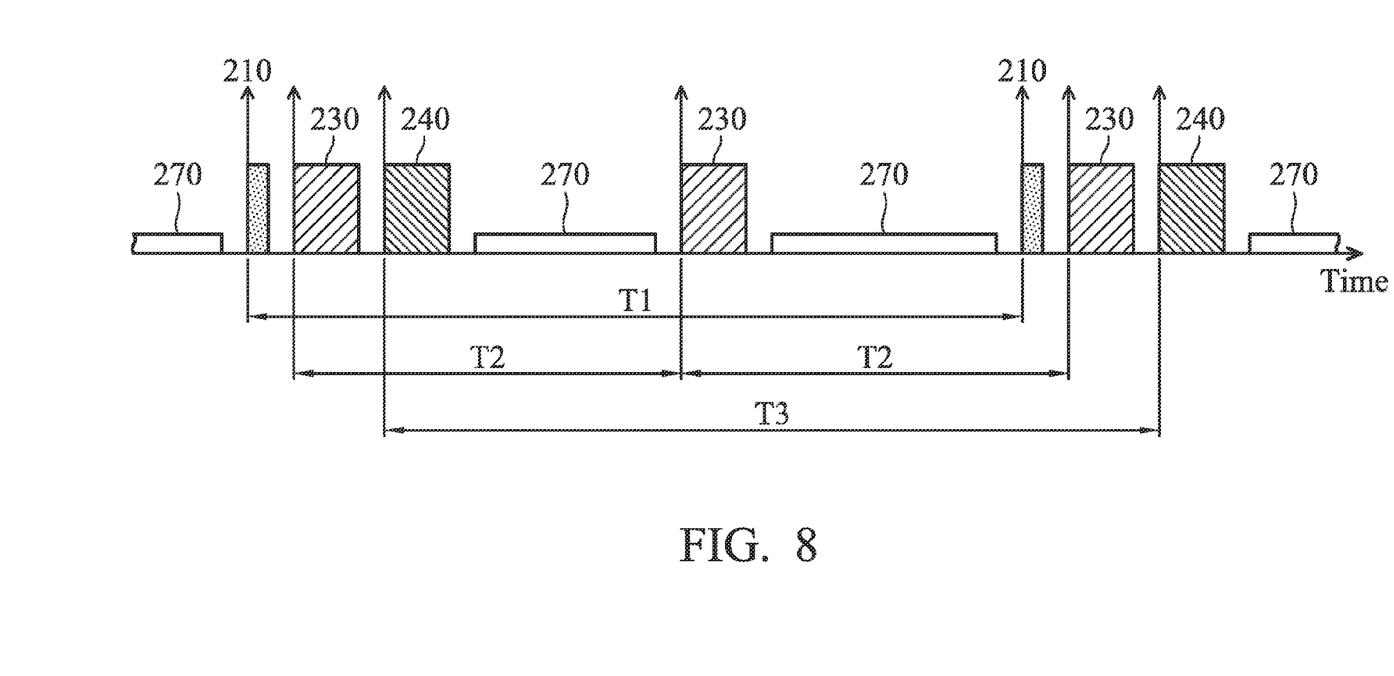
FIG. 8 is a timing diagram for illustrating operations of a Bluetooth device and an RF module therein according to an embodiment of the invention.

FIG. 8 is a diagram for illustrating the operations of the Bluetooth device 110 and the RF module 130 therein on a time axis according to an embodiment of the invention. FIG. 8 is similar to FIG. 4. The difference from the embodiment of FIG. 4 is that the second wakeup operation 240 is included and performed periodically at intervals of a third time period T3. In some embodiments, the first time period T1 is substantially equal to the third time period T3. In some embodiments, the first time period T1 is substantially a multiple of the third time period T3. In some embodiments, the third time period T3 is substantially a multiple of the first time period T1. The multiple may be any positive integer greater than 1, such as 2, 3, 4, or 5, etc. In the embodiment, the wakeup/sleep preparation is also done as few times as possible, and the power consumption of the Bluetooth device 110 is effectively reduced. Similarly, four or more wakeup operations may be included and performed periodically at intervals, and each interval may be appropriately adjusted as mentioned above. Other features of the embodiment of FIG. 8 are the same as those of FIG. 4. Accordingly, the two embodiments can achieve similar effects.

Figure 9:
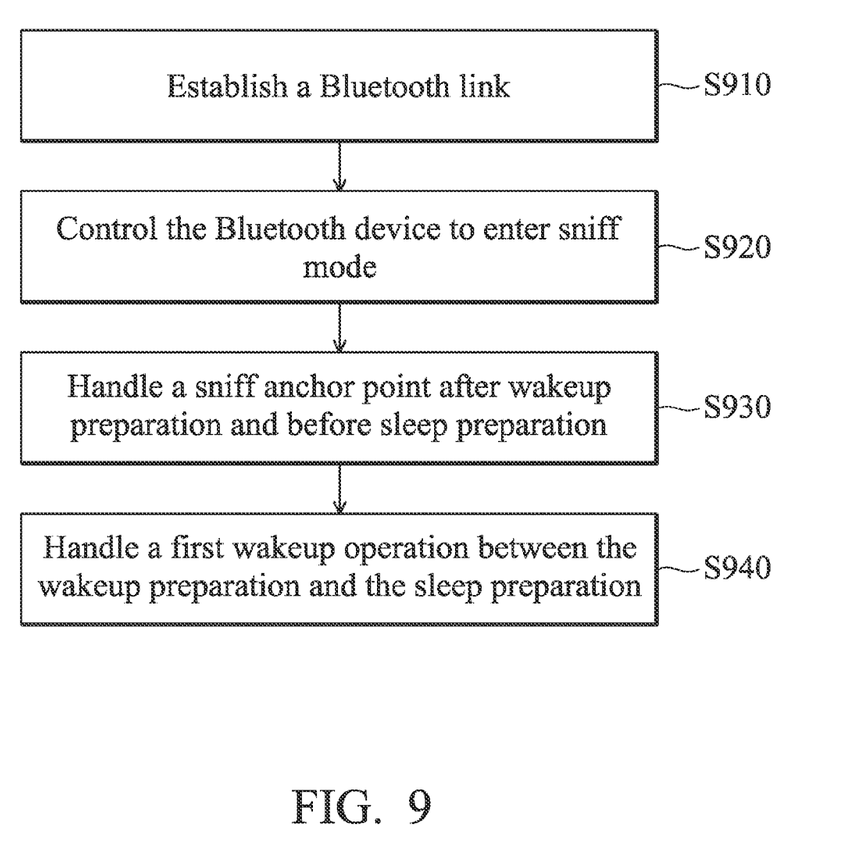
FIG. 9 is a flowchart for illustrating a method for controlling a Bluetooth device according to an embodiment of the invention.

FIG. 9 is a flowchart for illustrating a method for controlling a Bluetooth device according to an embodiment of the invention. To begin, in step S910, a Bluetooth link is established. In step S920, the Bluetooth device is controlled to enter sniff mode. In step S930, a sniff anchor point is handled after wakeup preparation and before sleep preparation. Finally, in step S940, a wakeup operation is handled between the wakeup preparation and the sleep preparation. In some embodiments, the method further comprises the step of handling another wakeup operation between the wakeup preparation and the sleep preparation. Note that the foregoing steps are not required to be performed in order. In addition, every detailed feature of the embodiments of FIGS. 2-8 may be applied to the method of FIG. 9.

In some embodiments, the invention is implemented with any type of an electronic device. The electronic device with a Bluetooth function comprises means for establishing a Bluetooth link, means for entering sniff mode, means for handling a sniff anchor point after wakeup preparation and before sleep preparation, and means for handling a wakeup operation between the wakeup preparation and the sleep preparation.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling a Bluetooth device, comprising the steps of:
    establishing a Bluetooth link;
    controlling the Bluetooth device to enter sniff mode;
    handling a sniff anchor point after wakeup preparation and before sleep preparation;
    handling a first wakeup operation between the wakeup preparation and the sleep preparation; and
    appending the first wakeup operation to coincide with the sniff anchor point when a timing interval of first wakeup operations and a timing interval of sniff anchor points are equal or multiples of each other.

2. The method as claimed in claim 1, wherein the first wakeup operation is a page scan.

3. The method as claimed in claim 1, wherein the first wakeup operation is an inquiry scan.

4. The method as claimed in claim 1, wherein the wakeup preparation comprises a clock settling count.

5. The method as claimed in claim 1, wherein the wakeup preparation comprises clock compensation.

6. The method as claimed in claim 1, wherein the Bluetooth device exchanges packets with a remote device within sniff attempt.

7. The method as claimed in claim 1, wherein the Bluetooth device does not enter any sleep mode between the wakeup preparation and the sleep preparation.

8. A method for controlling a Bluetooth device, comprising the steps of:
    establishing a Bluetooth link;
    controlling the Bluetooth device to enter sniff mode;
    handling a sniff anchor point after wakeup preparation and before sleep preparation; and
    handling a first wakeup operation between the wakeup preparation and the sleep preparation, wherein the sniff anchor point is handled periodically at intervals of a first time period, and the first wakeup operation is performed periodically at intervals of a second time period.

9. The method as claimed in claim 8, wherein the first time period is substantially equal to the second time period.

10. The method as claimed in claim 8, wherein the first time period is substantially a multiple of the second time period.

11. The method as claimed in claim 8, wherein the second time period is substantially a multiple of the first time period.

12. The method as claimed in claim 8, further comprising: handling a second wakeup operation between the wakeup preparation and the sleep preparation.

13. The method as claimed in claim 12, wherein the first wakeup operation is a page scan, and the second wakeup operation is an inquiry scan.

14. The method as claimed in claim 12, wherein the second wakeup operation is performed periodically at intervals of a third time period.

15. The method as claimed in claim 14, wherein the first time period is substantially equal to the third time period.

16. The method as claimed in claim 14, wherein the first time period is substantially a multiple of the third time period.

17. The method as claimed in claim 14, wherein the third time period is substantially a multiple of the first time period.

18. A Bluetooth device, comprising:
an antenna;
an RF (Radio Frequency) module, coupled to the antenna; and
a baseband module, comprising a controller,
wherein the controller controls the RF module to establish a Bluetooth link, to enter sniff mode, to handle a sniff anchor point after wakeup preparation and before sleep preparation, to handle a wakeup operation between the wakeup preparation and the sleep preparation, and to append the first wakeup operation to coincide with the sniff anchor point when a timing interval of first wakeup operations and a timing interval of sniff anchor points are equal or multiples of each other.

19. An electronic device, comprising:
means for establishing Bluetooth link;
means for entering sniff mode;
means for handling a sniff anchor point after wakeup preparation and before sleep preparation;
means for handling a wakeup operation between the wakeup preparation and the sleep preparation; and
means for appending the first wakeup operation to coincide with the sniff anchor point when a timing interval of first wakeup operations and a timing interval of sniff anchor points are equal or multiples of each other.

* * * * *